United States Patent
Postma et al.

(10) Patent No.: US 9,091,488 B2
(45) Date of Patent: Jul. 28, 2015

(54) THERMOSIPHON EVAPORATOR

(75) Inventors: Ron Postma, Voorburg (NL); Bart Jan Van Den Berg, Utrecht (NL); Robert Sakko, Vlaardingen (NL); Hans Constant Dikhoff, Eindhoven (NL)

(73) Assignee: HeatMatrix Group B.V., Vught (NL)

( * ) Notice: Subject to any disclaimer, the term of this patent is extended or adjusted under 35 U.S.C. 154(b) by 959 days.

(21) Appl. No.: 13/143,674

(22) PCT Filed: Jan. 8, 2010

(86) PCT No.: PCT/EP2010/000186
§ 371 (c)(1),
(2), (4) Date: Sep. 19, 2011

(87) PCT Pub. No.: WO2010/079148
PCT Pub. Date: Jul. 15, 2010

(65) Prior Publication Data
US 2012/0018133 A1    Jan. 26, 2012

(30) Foreign Application Priority Data
Jan. 12, 2009 (EP) .................................... 09150390

(51) Int. Cl.
*B01D 1/26* (2006.01)
*F28D 7/16* (2006.01)
(Continued)

(52) U.S. Cl.
CPC ................. *F28D 7/1653* (2013.01); *B01D 1/02* (2013.01); *B01D 1/26* (2013.01); *B01D 5/0075* (2013.01);
(Continued)

(58) Field of Classification Search
CPC .......... F28D 7/1653; B01D 1/02; B01D 1/26; B01D 5/0075
USPC ........... 159/17.1, 17.2, 17.4, 20.1, 47.1, 13.1; 203/11, 71, 72, 73, 80; 202/174; 426/599
See application file for complete search history.

(56) References Cited

U.S. PATENT DOCUMENTS 3,240,266 A    3/1966 Corbet et al.
3,768,539 A * 10/1973 Chamberlin et al. ........ 159/13.2
(Continued)

FOREIGN PATENT DOCUMENTS

EP    2 015 017    1/2009
FR    1 259 288    4/1961
(Continued)

OTHER PUBLICATIONS

Communication pursuant to Article 94(3) EPC in European Application No. 10 700 502.7-1213 mailed Sep. 5, 2012, 6 pages.
(Continued)

*Primary Examiner* — Nina Bhat
(74) *Attorney, Agent, or Firm* — Thomas|Horstemeyer, LLP

(57) ABSTRACT

The invention relates to an evaporator (10) for heat exchange between fluids, comprising a housing (12) having at least one inlet (20; 27) and at least one outlet (26, 28; 29) for each fluid, the inlet and outlet for each fluid being connected to one another by a flow path (38; 58), the flow path (38) of a first fluid comprising multiple heat exchange modules (60) comprising at least one longitudinal hollow tube (36), wherein the modules (60) are arranged in a stack spaced apart from the housing (12) leaving free a gap (59), and wherein a module (60) is provided with at least one connector (50) for connecting to a co-operating connector of an adjacent module, such that the gap (59) between the housing and the stack defining at least a liquid recycle zone for containing the second fluid and a phase separation zone for separating a vapor phase and a liquid phase of the second fluid and the space (56) enclosed between adjacent modules in the stack defining a flow path (58) for a second fluid, parallel to the flow path (38) for the first fluid, are in fluid communication with each other.

20 Claims, 13 Drawing Sheets

(51) Int. Cl.
  *B01D 5/00* (2006.01)
  *B01D 1/02* (2006.01)
  *F28D 3/02* (2006.01)
  *F28D 7/00* (2006.01)
  *F28F 1/14* (2006.01)
  *F28F 9/013* (2006.01)
  *F28D 21/00* (2006.01)

(52) U.S. Cl.
  CPC ............... *F28D 3/02* (2013.01); *F28D 7/0041* (2013.01); *F28F 1/14* (2013.01); *F28F 9/013* (2013.01); *F28D 2021/0064* (2013.01); *F28F 2275/085* (2013.01); *F28F 2275/14* (2013.01)

(56) References Cited

U.S. PATENT DOCUMENTS

| | | | |
|---|---|---|---|
| 3,955,620 A | 5/1976 | Artemov et al. | |
| 4,106,560 A | 8/1978 | Lauro | |
| 4,253,516 A | 3/1981 | Giardina | |
| 4,520,866 A | 6/1985 | Nakajima et al. | |
| 4,693,302 A * | 9/1987 | Dodds | 165/46 |
| 4,941,330 A * | 7/1990 | Williamson | 62/515 |
| 5,423,952 A | 6/1995 | Stout | |
| 7,231,962 B2 * | 6/2007 | Han | 165/96 |
| 7,476,298 B2 * | 1/2009 | Stout | 202/174 |
| 8,691,054 B2 * | 4/2014 | Alt | 202/173 |
| 2006/0157338 A1 * | 7/2006 | Eddington | 203/21 |

FOREIGN PATENT DOCUMENTS

| | | |
|---|---|---|
| GB | 672 721 | 5/1952 |
| JP | 60-181587 | 9/1985 |
| WO | 2005/071339 | 8/2005 |

OTHER PUBLICATIONS

International Search Report in International Application No. PCT/EP2010/000186 mailed Jun. 15, 2010, 5 pages.

* cited by examiner

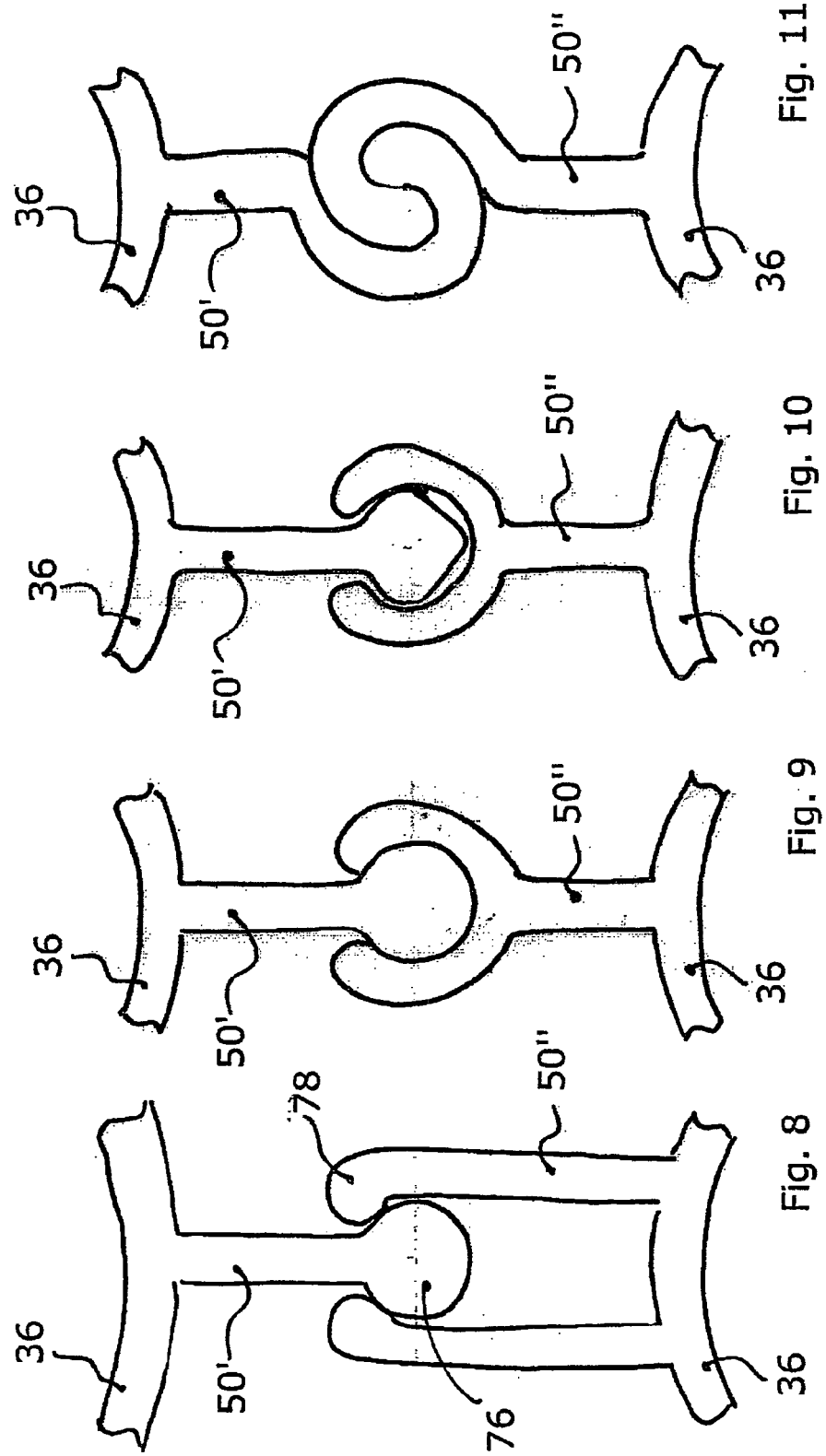

THERMOSIPHON EVAPORATOR

CROSS-REFERENCE TO RELATED APPLICATION

This application is the National Stage of International Application no. PCT/EP2010/000186, filed Jan. 8, 2010, which claims the benefit of EP patent application number 09150390.4, filed Jan. 12, 2009, the contents of which are incorporated by reference as if fully set forth herein.

BACKGROUND

The present invention relates to an evaporator which can be advantageously applied in Multi Effect Distillation (MED) processes.

Multi Effect Distillation (MED) processes have been used in industry for juice evaporation, to concentrate a substance, production of salts and for salty and marine water distillation for fresh water production, for desalination of seawater, brackish waters and in general any water or liquid containing dissolved solids, in order to produce fresh water. In a MED process, only a portion of a liquid feed submitted to the heat transfer surfaces is evaporated. Each stage of the MED process, also called "effect" operates at a different pressure. The remaining liquid of each effect, usually called brine, is fed to the liquid inlet of a next effect, where again a part thereof is evaporated into vapour. Produced vapour in one effect is also passed to the next effect and will give up heat to boil the remaining liquid transferred to the next effect due to temperature differences between them. Examples of MED configurations are shown in U.S. Pat. Nos. 3,245,883, 3,884,767, 3,261,766, 3,021,265.

In order to transfer heat, shell and tube type exchangers, plate type exchangers or tube bundles with sprays nozzles are applied. Frequently these exchangers are made from metal corrosion resistant materials like titanium and the like. Known disadvantages of these designs based on metals are their sensitivity to fouling and scaling and that they are only economical attractive at large scale.

New types of evaporators (or condensors) have been developed to account for these disadvantages. These new types apply plastics like polypropylene, poly vinyl chloride and poly ethylene to reduce material cost and prevent scaling. The non-scaling behaviour of plastics is known throughout the industry. However, plastics are less heat conductive compared to metals which results in the requirement to separate the fluids by a very thin wall in order to be of any practical use.

GB 1,157,301 has disclosed an evaporator for evaporation which applies plastic tubes, made of flexible polyethylene film, with a falling evaporating liquid film on the outside and condensing vapour on the inside of the tubes. It is also mentioned that stand pipes are required in order to facilitate the necessary supporting.

CN 101012071 has disclosed also a falling film evaporator utilizing plastic film for the construction of the flow path for the condensing vapour. The flow paths are connected according to a 'mattress'-like configuration on which the liquid is distributed in order to create a liquid film.

An alternative plastic 'mattress' design is described by T. N. Scheffler and A. J. Leao in 'Fabrication of polymer film heat transfer elements for energy efficient multi-effect distillation'. The latter reference also describes the main disadvantage of plastic falling film evaporators, which is the non-wetting feature of plastics. When the plastic heat transfer surface is not sufficiently wetted by the respective liquid, then the effective heat transfer area will be much less. Also the heat transfer coefficient will be lower because of the non-wetting features of plastic and the relative low velocity of the falling liquid film.

Another disadvantage of the known plastic thin wall evaporators is, that not every flow path of the first fluid (vapour) is surrounded by the flow path of the other fluid (vapour-liquid) to the maximum extent. The known 'mattress'-like configuration results therefore in a lower effective heat transfer area per volume and will also lead to stability and strength problems when the tubes of the mattress have several meters of length. Finally, spray nozzles or other liquid film distributors could plug rapidly when the evaporating liquid contains solids and/or scaling fragments.

It is obvious that the designs discussed above and their assembling processes are complicated, cumbersome, laborious, time-consuming and therefore expensive, offering a suboptimal final product with respect to its final heat transfer properties.

SUMMARY

An object of the present invention is to eliminate one or more of these disadvantages.

More particularly, an object is to provide an evaporator, preferably made from plastic material, having improved wetting properties of the heat transfer surface and/or an improved heat transfer coefficient.

Another object is to provide an evaporator with internal provisions to separate the circulating liquid from the generated vapour.

Yet another object is to provide an evaporator, preferably made from plastic material due to its favourable anti-fouling and anti-corrosion properties and despite its poor heat transfer properties, allowing an improvement of the total strength and stability in order to keep the wall thickness low in view of heat transfer.

Still another object is to provide an evaporator having a stable and strong configuration, wherein the stability and strength are mainly achieved by the general design and are dependent to a lesser extent from the nature of the construction materials and thicknesses thereof than the general design.

Yet another object is to provide an evaporator, which is easy to manufacture, in particular to assemble from modular parts and to disassemble if needed.

Another object is to provide an evaporator having a high heat transfer area over volume ratio ($m^2/m^3$).

Yet another object is to provide an industrial scale evaporator allowing the use of corrosive media as starting fluids such as seawater and reducing the risk of fouling.

An evaporator according to the invention is defined in claim 1, an assembly of two or more evaporators in claim 9, while an evaporating method according to the invention is claimed in claim 10. Preferred embodiments are defined in the dependent claims.

The evaporator for heat exchange between fluids comprises a housing having at least one inlet and at least one outlet for each fluid. The inlet and outlet for each fluid are connected to one another by a flow path. The flow path of a first fluid comprises multiple heat exchange modules comprising at least one longitudinal hollow tube. The modules are arranged in a stack spaced apart from the housing leaving free a gap, the function of which is explained below. Preferably the stack comprises a matrix configuration of at least two columns of longitudinal tubes and at least two rows of longitudinal tubes. A module is provided with at least one connector for connecting to a co-operating connector of an adjacent module. The gap between the housing and the stack defines at least a liquid recycle zone for containing the second fluid and a phase separation zone for separating a vapour phase and a liquid phase of the second fluid. The space enclosed between adjacent modules, more precisely the space between the longitudinal tubes of adjacent modules and associated connectors, defines a flow path for a second fluid, parallel to the flow path for the first fluid. Said gap and this space are in fluid communication with each other.

According to the present invention an evaporator is provided which concentrates a liquid feed mixture to a so called brine while simultaneously extracting the lower boiling components from the feed, frequently the solvent of a salt containing feed like water. The product aimed for may be either the lower boiling components such as water e.g. in desalination processes, or the concentrated brine e.g. in juice purification. In other words the evaporator acts as a purifier and concentrator. This evaporator can be more advantageously applied in so called multi effect distillation processes where the vapour generated from the second fluid of a first evaporator is used as a heat source (first fluid) in a next evaporator operating at a slightly lower pressure and temperature to allow heat transfer. With multi effect distillation the concentrating or purifying effect is multiplied according to the number of evaporators in series.

The evaporator according to the present invention is especially advantageous when made from plastic material due to the internal circulation flow driven by the heat input to the evaporator, which thoroughly wets the plastic heat transfer surface in its entirety. This circulation of a fluid occurs when a liquid fed to a downward leg of the evaporator is partly evaporated in an upward leg resulting in a lower average density of the generated vapour/liquid mixture. In this specification this circulating flow of the second fluid is called the thermosiphon effect. For a stable circulating flow it is important to have adequate separation of the vapour-liquid mixture exiting the upward leg—in other words the upper end of the space defining the second flow path—into its components and a return of the liquid to the liquid recycle zone (downward leg) in order to create enough liquid static head to compensate for the pressure loss. For this reason the evaporator according to the invention is provided with a vapour-liquid separation zone, a flow path for the returning liquid and a minimum distance between the entrance of the upward leg—the lower end of the space defining the second flow path—and the exit of the brine in order to provide liquid static head. The housing contains at least one inlet and outlet for the first fluid such as steam, at least one inlet for the second fluid usually (dissolved or dispersed) solids containing liquid, at least one outlet for the vapour and liquid of the second fluid, more preferably one outlet for the liquid phase and one outlet for the vapour phase of the second fluid.

In a preferred embodiment of the present invention the outlet of the vapour phase of the second fluid is located above the inlet of the second fluid. The inlet of the second fluid may be located above the outlet of the liquid phase of the second fluid. More preferably the inlet of the second fluid is located below the outlet of the liquid phase of the second fluid in order to prevent flashing at the entry.

In a further preferred embodiment according to the invention the vapour-liquid separation is enhanced by application of physical means, in particular for generating centrifugal forces such as a cyclone shaped vane around the vapour-liquid outlet for the second fluid and/or a combined distributing and vapour-liquid separating chamber of a subsequent evaporator.

The flow paths of the evaporator according to the present invention are preferably positioned in a vertical position. In an alternative embodiment of the invention the flow paths of the evaporator are positioned in a horizontal position or under a small angle, such as less than 15 degrees.

In yet another preferred embodiment according to the invention a perforated plate (restriction plate with holes) is located around the stack of modules separating the recycle zone from the phase separating zone. The circulating liquid phase of the second fluid is collected at this restriction plate and redirected to the side of the housing where the inlet of the second fluid is located for optimal mixing with fresh second fluid. The flow is orientated downwardly due to gravity. The restriction plate also enables preferred evaporation inside the stack of modules instead of evaporation of liquid underneath the restriction plate at start-up conditions. In other words the perforated plate acts as a liquid seal. Other examples of means for providing a liquid seal comprise a movable valve or sealing pan.

In yet another preferred embodiment a cyclone shaped vane and the perforated plate (acting as a liquid seal) are combined into a single piece.

According to the present invention an evaporator for heat exchange between fluids, in particular between a vapour and a liquid comprising dissolved or dispersed solids, is provided, comprising a housing having an inlet and an outlet for the first fluid connected to one another by a flow path. The housing also has an inlet and an outlet, preferably two outlets, for the second fluid connected to one another by a flow path. The flow path of a first fluid comprises multiple heat exchange modules comprising at least one longitudinal hollow tube, wherein the modules are arranged in a stack—preferably a matrix configuration that comprises at least two columns of longitudinal tubes and at least two rows of longitudinal tubes—, wherein a module is provided with at least one connector for connecting to a co-operating connector of an adjacent module, such that the space enclosed between adjacent modules defines a flow path for a second fluid, parallel to the flow path for the first fluid. In the evaporator according to the invention a plurality of modules is arranged in a housing having an inlet and an outlet for each fluid. A module comprises at least one longitudinal hollow tube. Together the tubes establish a flow path for a first fluid from the respective inlet to the co-operating outlet in fluid communication therewith. A module is also provided with at least one connector for connecting to an adjacent module that is also provided with a suitable connector co-operating with the first mentioned connector. Due to these co-operating connecting means the evaporator according to the invention can be manufactured easily from a plurality of modules. Furthermore easy replacement in case of malfunctioning is allowed. Advantageously each module is provided with one or more connectors, preferably integral with the longitudinal tube, more preferably essentially extending over the full length thereof, for connecting to a co-operating connector of each adjacent module. In this embodiment the resulting stack or matrix configuration is a self-supporting arrangement. In a further preferred embodiment the modules are arranged in a rectangular matrix configuration such that the outer walls of the longitudinal tubes and the connectors of two or more modules, preferably four, enclose a space extending in the direction of the longitudinal tubes of the modules. Due to the three dimensional connections between the modules in the matrix the strength and stability thereof are high. As a result the wall thickness of the longitudinal tubes can be low thereby maintaining the heat transfer properties at a favourable level, even if the modules are manufactured from a starting material having a poor heat transfer coefficient such as plastic. The co-operating connectors of different modules are partitions separating adjacent spaces forming the flow path for a second fluid. Such a flow path fluidly connects the space between the housing and a stack of modules and the inlet and outlet or outlets for said second fluid. As during use the same second fluid flows at different sides of the connectors under essentially the same flow conditions, these connectors do not need sealing means in the longitudinal direction. The outer walls of the longitudinal tubes form an impermeable barrier separating the first and second fluid between which heat is exchanged. Due to the design wherein a longitudinal tube for a first fluid is surrounded on all longitudinal sides by the space(s) for a second fluid a compact evaporator having a high heat transfer area over volume ratio ($m^2/m^3$) is obtained. Furthermore manufacturing costs may be kept at a low level compared to evaporators requiring a laborious method for coupling several modules.

Advantageously the modules used in the evaporator according to the invention are made in one piece from a plastic, preferably from a thermoplastic material, more preferably by extrusion.

Plastic is less sensitive to fouling and scaling, which otherwise would affect heat transfer. As the connectors and the matrix configuration attribute to the strength and stability, the wall thickness of the longitudinal tubes can be kept low, thereby allowing a reasonably high heat transfer despite the fact that the heat thermal conductivity for plastics is low compared to heat conductive materials like metals. Furthermore due to the thermo siphon design and operation the disadvantageous non-wetting properties of plastic are compensated sufficiently. Thus a compact design of an evaporator is possible. Where resistance against corrosion is less important, the evaporator can also be manufactured from metals, metal alloys and carbon, as these kind of materials are preferred in view of heat transfer. Due to the general design of the evaporator as outlined above and the resulting stability and strength the wall thickness of the longitudinal tubes can be kept low for plastic materials in view of heat transfer properties, while for expensive materials like titanium the cost price of the longitudinal tubes can be reduced because the amount of material needed is low.

A longitudinal tube, more precisely the lumen thereof, is part of the flow path for a first fluid. A "space" enclosed by assembled modules provides a flow path for a second fluid. For sake of convenience, the adjective "first" will be used in this specification to indicate parts of the evaporator intended for a first fluid during use. Similarly, the adjective "second" will be used in this specification to indicate parts of the evaporator intended for a second fluid during use.

In the evaporator the main directions of the flows of the first and second flow are parallel to each other, preferably in opposite directions such as in a countercurrent evaporator having a higher overall performance than a cross-flow evaporator or alternatingly co-current and countercurrent as in a multipass evaporator.

Advantageously a module is made from a plastic material thereby reducing the risk of corrosion, as well as the occurrence of fouling. These characteristics are significant, where one or more of the fluids between which heat exchange has to take place, is aggressive such as corrosive themselves, for example, when the cooling fluid for a hot stream in a chemical plant is a liquid comprising one or more salts like seawater. The modules used in the evaporator according to the invention can be easily manufactured by extrusion of the (metal or plastic the latter being preferred) material in a desired length. In practice, an evaporator on industrial scale may have a length up to 10 meters or more. Preferably a module has a suitable length corresponding to the longitudinal dimension of the housing, thereby not requiring to mount more than one module one behind the other in the lengthwise direction of the evaporator. When the length of a module is limited by the manufacturing technique, a number of such modules can be arranged one behind the other in the direction of a flow path using suitable coupling means.

Compared to the evaporators as disclosed in the prior art discussed above, the number of welds and the like in order to assemble the plurality of modules is decreased, which makes manufacturing more easy and less expensive.

In the evaporator according to the invention the modules are preferably arranged in a matrix configuration comprising at least two columns of longitudinal tubes and at least two rows of longitudinal tubes. More preferably a column and a row may comprises tens to hundreds of longitudinal tubes in view of capacity and heat transfer area.

Preferably a longitudinal tube has a circular cross-section providing a high heat transfer area over volume ratio in relation to the hydraulic diameter. In addition, the ends of circular tubes are sealed easily in similar through bores and the like of header/distributor/collector panels to be discussed herein below due to the circular shape. Furthermore extension if required can be provided by (circular) tube sections having appropriate dimensions. As to the wall thickness, the thinner the better. Long but small diameter thin-walled tubes are preferred, e.g. tubes having a wall thickness in the order of magnitude of 0.1 mm, typically 0.01-1 mm, but preferably less than 0.1 mm.

Advantageously a connector substantially extends over the whole length of a module, parallel to the longitudinal axis of a module. In this way the connectors serve as supports for other modules over the full length thereby providing a stable and strong heat exchange block. Such longitudinally extending connectors can also easily be manufactured by extrusion. Preferably a module comprising at least one tube and respective connectors is made in one piece.

Preferably a module has at least one male connector and at least one female connector. A snap fit is a suitable example of co-operating male and female connectors. A rib or fin is a suitable male connector, while two spaced apart ribs or fins establish a suitable female connector. As said herein above, sealing between adjacent spaces is not required. If necessary, the outer surface of such a rib acting as a male connector may have one or more protrusions matching corresponding recesses in the inner surfaces facing each other of the ribs acting as a female connector.

In a particular preferred embodiment a module comprises one longitudinal tube and its associated connectors. Such a module can be handled relatively easily and allows easy exchange if necessary without distortion of the other stacked and connected modules.

Advantageously the longitudinal tube is provided with at least two connectors, the angle between adjacent connectors being less than 180 degrees, preferably four connectors at an angle of 90 degrees. The latter embodiment allows for a particularly stable rectangular main matrix configuration having a high heat transfer area over volume ratio ($m^2/m^3$), while the periphery may have any shape.

In an alternative embodiment a module comprises at least two longitudinal tubes connected to each other in a side-by-side configuration by an interconnecting web of material in one piece. Such a module offers the advantage of less assembling work, and is particularly suitable for a evaporator designed for low to moderate operating pressures. Preferably the end tubes thereof are provided with the appropriate connectors for connecting to each adjacent module, again allowing a stable and strong matrix configuration.

The evaporator according to the invention advantageously comprises a distributor for connecting the inlet for a fluid to the respective flow path and a collector for connecting the respective flow path to the outlet for said fluid. This means that during use a first fluid flows from a typically single first inlet through the distributor comprising a chamber in fluid connection with the first inlet to the respective first flow path. In this way the distributor distributes the first fluid stream flowing in a first direction over the longitudinal tubes of the evaporator, typically from the top to the bottom in a vertical configuration. At the other end of the modules this first fluid stream is collected in a collector comprising a collecting chamber and discharged via the respective first outlet.

A distributor and collector are also provided for the second fluid. The distributor and collector of the second fluid are connected to the inlet and outlet or outlets via a space, called recycle zone, between the housing and a stack of modules. This configuration for the second fluid will generate a thermo siphon circulating flow when heat of the first fluid evaporates part of the second fluid. It is preferred to have a separate outlet for the vapour phase of the second fluid and for the remaining liquid phase of the second fluid.

In an evaporator of the multipass type the same configuration can be applied provided that suitable fluid returning means e.g. partition plates are provided in the distributor and/or collector. Such a modification of connecting one part of tube ends and/or spaces respectively to another part of tube ends and spaces leaves the basic design of the evaporator according to the invention intact.

In a preferred embodiment according to the invention the inlet and outlet of the first fluid flowing through the longitudinal tubes are arranged in opposite end walls, while the inlet and outlet of the second fluid flowing through the spaces surrounding the longitudinal tubes are present in the side wall(s) of the housing. This configuration allows for a favourable mounting of the modules, as sealing is less complex.

More preferably in such an embodiment a first distributor for a first fluid comprises a distributing chamber at one end of the housing defined by an end wall of the housing, a distributor panel spaced apart from said end wall and the respective side wall sections of the housing, and wherein a first collector for the first fluid comprises a collecting chamber at the opposite end of the housing defined by the opposite end wall of the housing, a collector panel spaced apart from said opposite end wall and the respective side wall sections of the housing, and wherein the distributor panel and the collector panel are provided with a plurality of through bores corresponding to the total number and positions of the tubes defining the first flow path, the longitudinal tubes extending through the through bores of the distributor panel and collector panel in fluid communication with the distributing chamber and collector chamber. In this preferred configuration the distributor and the collector for a first fluid are positioned at the opposite ends of the evaporator.

In a further preferred embodiment thereof a second distributor for a second fluid is present at said opposite end of the housing defined by the collector panel, the connector sections of the modules facing the collector panel and surrounded by the liquid recycle zone. A second collector for the second fluid is preferably present at said first end of the housing defined by the distributor panel, the connector sections of the modules facing the distributor panel and surrounded by the phase separation zone. The second distributor and second collector are in fluid communication via the space enclosed between adjacent modules in the stack defining the flow path for the second fluid. The flow of the second fluid is from the inlet to the liquid recycle zone to the second distributor, then via the second flow path in the stack of modules to the collector and then to the phase separation zone, liquid returning via the gap to the liquid recycle zone. Part of the liquid will be discharged at the outlet for the liquid phase of the second fluid, while the vapour phase will exit via its respective outlet. The collector and distributor for a second fluid are positioned longitudinally adjacent to the distributor and collector for the first fluid respectively, while the tubes in which during use the first fluid flows extend through the distributor and collector of the second fluid. In order to effectively separate adjacent chambers of the first fluid in the evaporator the tubes are sealed in the distributor and collector panel respectively.

Usually a collector and a distributor panel supporting the ends of the modules, in particular the ends of the longitudinal tubes thereof will be present. These panels have a plurality of through bores corresponding to the total number and positions of the tubes defining the first flow path. Then the inlet and outlet of the first fluid are provided in opposite end walls of the housing, while the inlet and outlet for the second fluid are provided in the side wall sections. As a result only in the distributor and collector of the second fluid some kind of cross-flow heat exchange will occur. However, the major heat exchange will occur in a counter flow arrangement as defined above.

If necessary, a longitudinal tube may have an extension. In a preferred embodiment thereof a longitudinal tube is provided with an extension part comprising a tube section having a rejuvenated end inserted in the open end of the longitudinal tube. The rejuvenated end provides a sealing fit inhibiting any leakage of fluids.

In another embodiment the connectors are absent or removed at one or both ends at the longitudinal tube.

The other end of the tube section advantageously extends through the through bore in the respective panel in a sealing manner. Preferably a seal such as an O ring is provided between the outer wall of the tube section and the wall part of the respective panel defining the through bore. Other types of sealing are welding and glueing.

The type of material from which the evaporator modules are made depends on the nature of the heat exchanging fluids as explained herein above. Metals, ceramics, carbon and plastic may be suitable starting materials, of which plastic is preferred.

As plastic material is a poor heat conductor compared to for example metals like copper, brass and stainless steel and carbon, the thickness of the walls between adjacent chambers is kept low taking into account the physical requirements that are to be met by the construction.

In order to increase the heat transfer the plastic material from which the modules are made, may comprise a heat conduction enhancing filler like carbon particles and the like. In order to increase the strength fiber-reinforced plastics may be used.

The preferred starting material from which the modules are made, is an extrudable material like plastic, for example polyethylene, polypropylene, polystyrene, polyvinylchloride and poly(meth)acrylaat, fluor containing polymers like $PTFE_x$ and biopolymers. Other plastic materials allowing higher operating temperatures for example over 100° C. to about 120° C. are polycarbonate and polysulfon. Polyvinyleen oxides, polyetherimides, polyethersulfons and especially fluor containing polymers or polyetheretherketon (PEEK) allow for even higher operating temperatures.

According to a second aspect the invention concerns an assembly of at least two evaporators according to invention as previously described, wherein the outlet of the vapour phase of the second fluid of a first evaporator is in fluid communication with the inlet of the first fluid of a second evaporator and the outlet of the liquid phase of the second fluid of the first evaporator is in fluid communication with the inlet of the second fluid in the second evaporator. The outlet for the vapour phase of the second fluid of the second evaporator may be connected to the inlet for the first fluid of a third evaporator. The outlet for the liquid phase of the second fluid of the second evaporator may be connected to the inlet for the second fluid in the third evaporator. Thus, as assembly of two, three or more evaporators can be constructed. The outlet for the vapour phase of the second fluid of the evaporator that is most downstream of the assembly may be connected to a condensor. The outlet for the liquid phase of the second fluid of the evaporator that is most downstream of the assembly may be a free outlet. This assembly allows to perform MED processes. In other words in case of an assembly of two evaporators, an evaporator according to the invention also comprises a second evaporator for heat exchange between fluids, the second evaporator likewise comprising a housing having at least one inlet and at least one outlet for each fluid, the inlet and outlet for each fluid being connected to one another by a flow path, the flow path of a first fluid comprising multiple heat exchange modules comprising at least one longitudinal hollow tube, wherein the modules are arranged in a stack spaced apart from the housing leaving free a gap, and wherein a module is provided with at least one connector for connecting to a co-operating connector of an adjacent module, such that the gap between the housing and the stack defining at least a liquid recycle zone for containing the second fluid and a phase separation zone for separating a vapour phase and a liquid phase of the second fluid and the space enclosed between adjacent modules in the stack defining a flow path for a second fluid, parallel to the flow path for the first fluid, are in fluid communication with each other, wherein the outlet of the vapour phase of the second fluid of a first evaporator is in fluid communication with the inlet of the first fluid of the second evaporator and the outlet of the liquid phase of the second fluid of the first evaporator is in fluid communication with the inlet of the second fluid in the second evaporator.

According to a third aspect the invention provides a method of evaporating a liquid comprising dissolved or dispersed solids using an evaporator, in particular an evaporator or an evaporator assembly according to the invention, comprising the steps of:

feeding a first fluid having a heat content and a second liquid comprising dissolved or dispersed solids separately at different sides of a heat exchanging surface of the evaporator, such that said second liquid is maintained at a certain level in a liquid recycle zone of said evaporator, thereby exchanging heat from the first fluid to the second liquid and partially evaporating said second liquid generating a vapour-liquid mixture, separating vapour from the vapour-liquid mixture in a phase separation zone and returning the liquid to the liquid recycle zone, wherein the flow of the second fluid is driven by the thermosiphon phenomena. Preferably the heat exchanging surface is a stack of plastic modules, more preferably a rectangular matrix of plastic modules as described hereinabove.

According to a further aspect the invention also resides in an evaporator module, obviously intended for assembling an evaporator according to the invention, said module comprising at least one longitudinal hollow tube, the module being provided with at least one connector for connecting to a co-operating connector of another module. The preferred embodiments specified above for the evaporator according to the invention equally apply to the module according to the invention.

Evaporators that require a long tube length could have a limited applicability as result of a high two phase flow pressure drop over the flow path of the second fluid inside the stack of modules. For those applications the evaporator according to the invention is able to operate as a falling film evaporator by modifying the collecting zone of the second fluid in a vertically positioned evaporator into a combined distributing zone for the second fluid and a collecting zone for the vapour phase of the second fluid. The former distributing zone of the second fluid will act in this case as a collecting zone for the liquid phase of the second fluid. In this particular embodiment of the invention the flow paths of the fluids fed to this falling film evaporator are orientated according to a co-current configuration. The second fluid is in this case distributed by a distributing plate into multiple liquid films falling at the surfaces of the modules. Normally such a liquid film will contract to a single stream due to the non-wetting characteristic of plastic materials resulting in a strongly reduced wetted area. This embodiment of a falling film evaporator according to the invention prevents contraction of the liquid film due to segmentation of the module surface by the module connectors. Contraction of the liquid film is in this case limited to at least a number of streams equal to the number of connectors that are comprised in the module(s). This configuration increases the wetted area and hence the efficiency of the falling film evaporator without the known use of chemical treatment of the plastic construction materials in order to improve the wetting properties thereof. It is known that chemical treatment of plastic may improve the wetting properties at the cost of reduced anti-fouling properties. The evaporator according to the invention allows efficient evaporation in a falling film type configuration with a highly wetted area, while maintaining all advantages of plastic materials, like anti-fouling, corrosion resistance, low weight and ease of manufacture. In a falling film type configuration the vapour generated from the second fluid flows in opposite direction of the film. Separation of the vapour and liquid takes place inside the stack of modules after which the vapour phase of the second fluid is collected in the distributor of the second fluid, which is separated in a distributing zone for the second fluid and a collecting zone for the vapour phase of the second fluid. The liquid phase of the second fluid is collected in the collector of the second fluid located at the bottom of the stack of modules. The vapour and liquid phase of the second fluid are led to the individual outlets.

BRIEF DESCRIPTION OF THE DRAWINGS

The invention will be further explained by reference to the attached drawing, wherein:

FIG. 5-11 show several embodiments of snap fits as connectors; and

DESCRIPTION OF PREFERRED EMBODIMENTS

Figure 1:
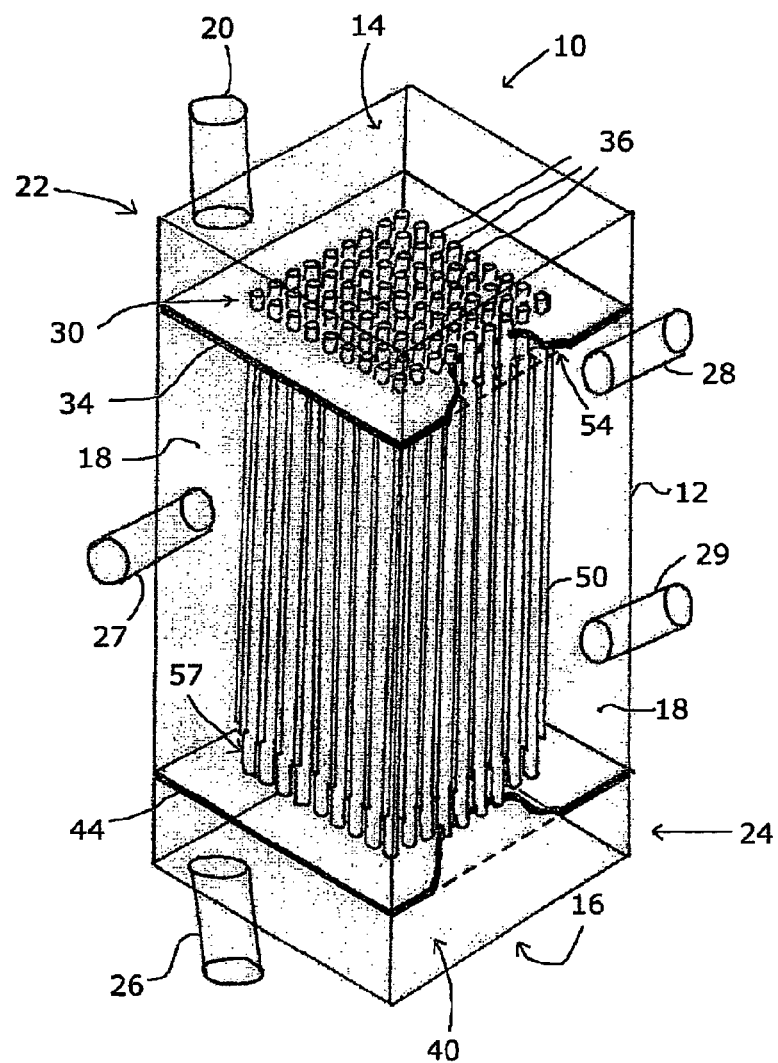
FIG. 1 is a schematic view of an embodiment of a thermosiphon evaporator according to the invention in vertical position.
Figure 2:
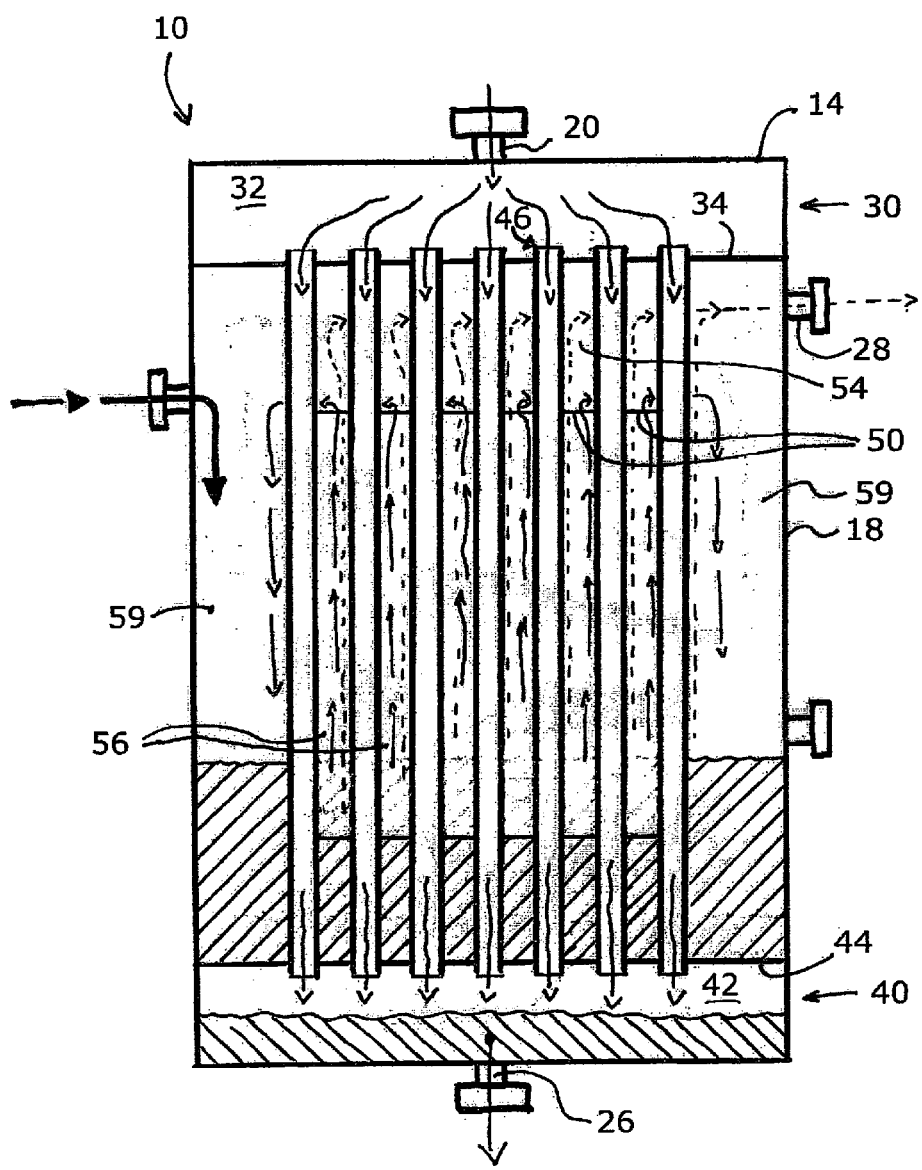
FIG. 2 is a schematic view of an embodiment of a thermosiphon evaporator illustrating the process according to the invention inside an evaporator in vertical position.
Figure 3:
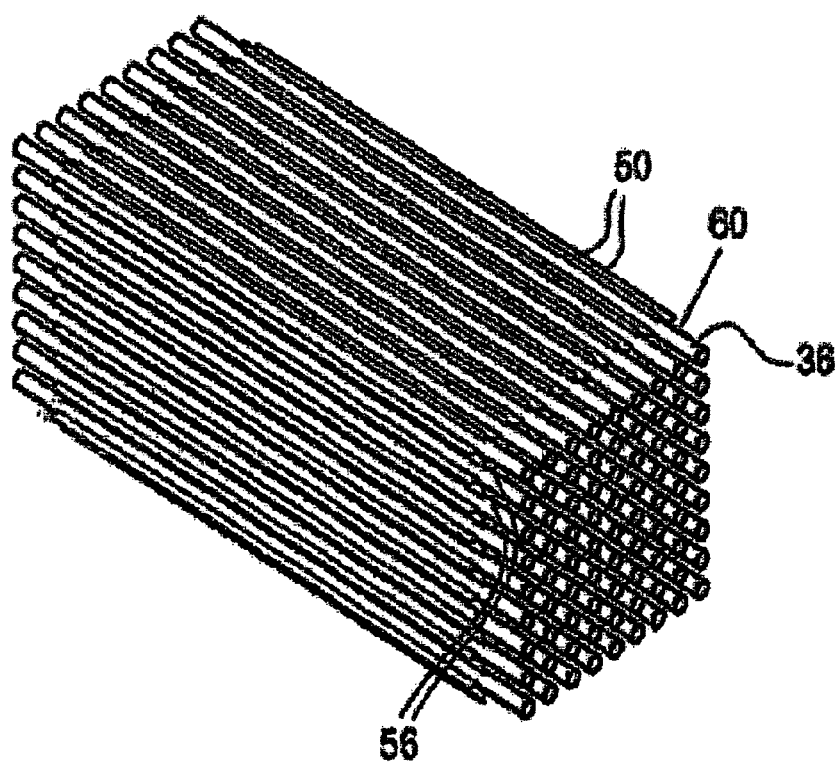
FIG. 3 shows a schematic view of a detail of the embodiment according to FIG. 1.

FIG. 1-3 show an embodiment of a vertically arranged thermo siphon evaporator according to the invention. The evaporator is indicated in its entirety by reference numeral 10. This evaporator 10 comprises a housing 12 comprising respective end walls 14 and 16 and side walls 18. A first inlet 20 for a first (hot) fluid is provided in an upper end wall 14 at a first end 22 of the evaporator 10. At the opposite end 24 a first outlet 26 is provided in the lower end wall 16. A second inlet 27 for a second (cold) fluid and second outlet 28 for the vapour phase of the second fluid are provided in a side wall 18 opposite to each other, while a further outlet 29 for the liquid phase of the second fluid is positioned below the outlet 28 of the vapour phase of the second fluid. The outlets 28 and 29 are positioned such that the height level of the inlet 27 is in between those of outlets 28 and 29. The inlet 20 is connected to a distributor 30 comprising a distributing chamber 32 in the housing 12. This chamber 32 is delimited by the first end wall 14, the respective upper parts of the side walls 18 adjacent said end wall 14 and a distributor panel 34. The distributing chamber 32 divides and feeds the first fluid over and into associated longitudinal tubes 36 defining a first flow path 38 (see FIG. 4). At the opposite end 24 a collector 40 comprises a collecting chamber 42 delimited by the second end wall 16, the respective lower parts of the side walls 18 adjacent said end wall 16 and a collector panel 44. The distributor panel 34 and collector panel 44 have through bores 46, the number and positions thereof corresponding to those of the longitudinal tubes 36. The first fluid is introduced in the evaporator 10 via the inlet 20 into the distributor 30. Then it flows into the open ends of the longitudinal tubes 36. The opposite open ends thereof open into the collector chamber 42, where the first fluid after heat exchange is collected and then discharged through outlet 26. The longitudinal tubes 36 have a modular design. In this embodiment each tube 36 having a circular cross-section is provided with four connectors 50 circumferentially spaced apart by 90°. Each connector 50 has a strip shape and extends essentially over the length of the longitudinal tube 36. At both ends of the longitudinal tube 36 the ends of connectors 50 have been removed over a certain length. Firstly, this allows the ends of a tube 36 to be inserted in the through bores 46 of the distributor panel 34 and the collector panel 44 in a sealing manner. Secondly, the length between the respective panel and the beginning (end) of a connector 50 is sufficient to provide fluid communication from a surrounding gap 59 defining an upper phase separation zone and an adjacent lower liquid recycle zone, to a second distributor 52 for the second fluid in the stack of modules at the opposite end 24. The phase separation zone surrounds a second collector 54 at the first top end. The connectors 50 of adjacent tubes 36 are connected to each other, thereby delimiting spaces 56 for the second fluid. Together these spaces 56 define a second flow path 58 for the second fluid (see FIG. 4). This second fluid is introduced via inlet 27 into the recycle zone of gap 59 between housing 12 and stack of modules and subsequently the second fluid flows in the second distributor 52. Then it flows through these spaces 56 in countercurrent to the first fluid and is partly evaporated. Subsequently the resulting vapour-liquid mixture of the second fluid is discharged from these spaces 56 into a second collector 54 and then this mixture flows into the phase separation zone in the top of the gap 59 where phase separation occurs. The remaining second fluid flows back through the gap via the liquid recycle zone to distributor 52 by gravity. The vapour produced from the second fluid is discharged via outlet 28. A tube 36 and its connectors 50 is a module indicated by reference numeral 60. By interconnecting these modules 60 by means of the connectors 50 a stable stack of modules is established.

FIG. 2 shows an embodiment of the thermo siphon evaporator process inside the evaporator 10 according to the invention as shown in FIG. 1. The process comprises a first fluid acting as a heat source, like sensible heat from a liquid or latent heat from a condensing vapour, which is fed to the first flow path 38 of the evaporator via the inlet 20 of the first fluid. This fluid is discharged via the outlet 26 of the first fluid after heat transfer between the first and second fluid. The second fluid is fed via the inlet 27 to the recycle zone of gap 59 between the stack of modules 60 and the housing 12. In the recycle zone of gap 59 the feed of the second fluid is mixed with the liquid recycle resulting from the vapour-liquid separation in the phase separation zone of the 2-phase flow exiting the collector 54 of the second fluid. The resulting mixture of the second fluid is collected at the bottom of the gap 59 up to a level that is determined by the location of the outlet 29 of the liquid phase of the second fluid. A part of the mixture is discharged as liquid phase of the second fluid via outlet 29 by overflow. The other part of the mixture is forced into the distributing chamber 52 of the second fluid and into the second flow path 58 as result of level equalization. The liquid inside the stack of modules 60 in the flow path 58 of the second fluid evaporates due to the transferred heat from the first fluid and the vapour-liquid mixture will rise accordingly. The 2-phase flow will rise to the collecting chamber 54 of the second fluid while absorbing more heat from the first fluid which generates more vapour. The vapour-liquid mixture exits the stack of modules via the collecting chamber 54 of the second fluid into the phase separation zone at the top of gap 59 where velocity is decreased and vapour-liquid separation occurs. The vapour phase is discharged via the vapour outlet 28 of the second fluid and the separated liquid phase is recycled to the bottom of the recycle chamber 59 by gravity.

Figure 4:
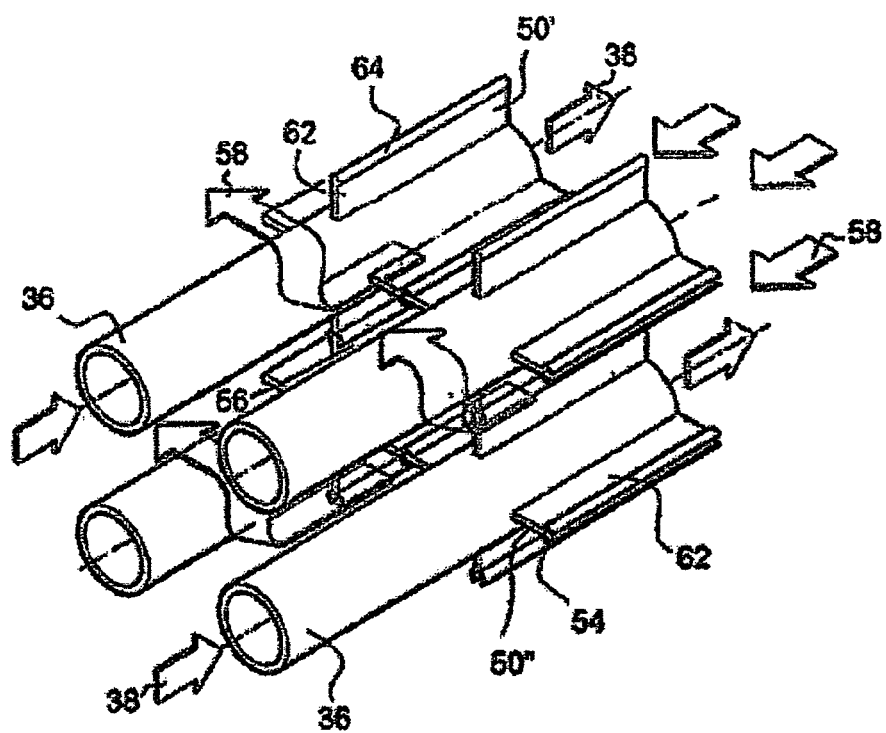
FIG. 4 schematically shows the principle flow directions of the heat exchanging fluids in the evaporator according to claim 1.

FIG. 3 shows the stacked modules 60 in a 9×9 matrix configuration. In FIG. 4 the flow direction of the first fluid flowing in the tubes 36 is indicated by downward arrows, while the flow direction of the second fluid flowing in the spaces 56 is indicated by upward arrows. Furthermore this FIG. 4 illustrates an embodiment of a male connector 50' comprising a longitudinal rib 62 having a rounded edge 64, which snap fits into a female connector 50" comprising a longitudinal rib 62 having a complementary cup shaped edge 54.

Figure 5:
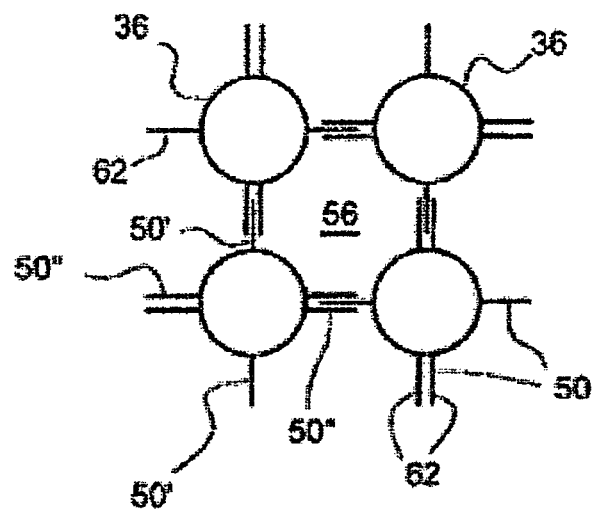
Figure 6:
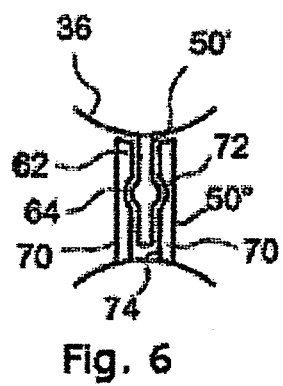
Figure 7:
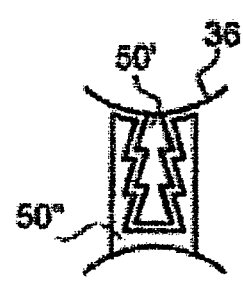

FIG. 5-11 show other examples of suitable male 50' and female connectors 50", in particular snap fit connections. In FIG. 5 the male connectors 50' comprise a radially extending flat rib 62 also extending in the longitudinal direction of the tube 36. A female connector 50" is comprised of a pair of parallel ribs 62 spaced apart over a width corresponding to the thickness of the rib 62 of a male connector 50'. FIG. 6 shows a rib 62 having a protrusion 64 at the middle of the height of the rib 62 as a male connector 50', while the ribs 70 of the female connector 50" have a recess 72 having a complementary shape at a corresponding position in the rib surfaces 74 facing each other. FIG. 7 shows a sawtooth configuration. Other suitable connectors would be slide fit and zip connections. FIGS. 8-11 show examples thereof. In particular the zip connection as shown in FIG. 8 is a preferred one. The male connector 50' comprises a ball tip 76 fitting below two inwardly hooked tips 78 of female connector 50".

Figure 12:
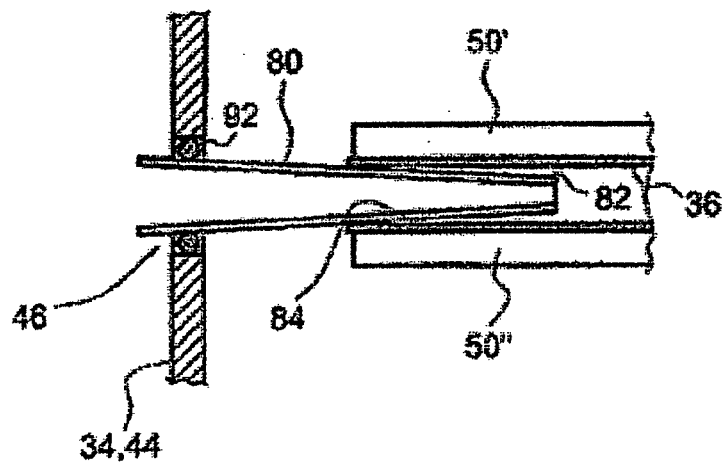
FIG. 12 shows an embodiment of a tube extension.

In FIG. 12 an extension comprising a tube section 80 having a rejuvenated end 82 is inserted in the open end 84 of a longitudinal tube 36, while the other open end of the tube section 80 extends through a bore 46 in a panel 34, 44. An O ring 92 seals the distributor/collector chamber for the first fluid from the collector/distributor chamber for the second fluid.

Figure 13:
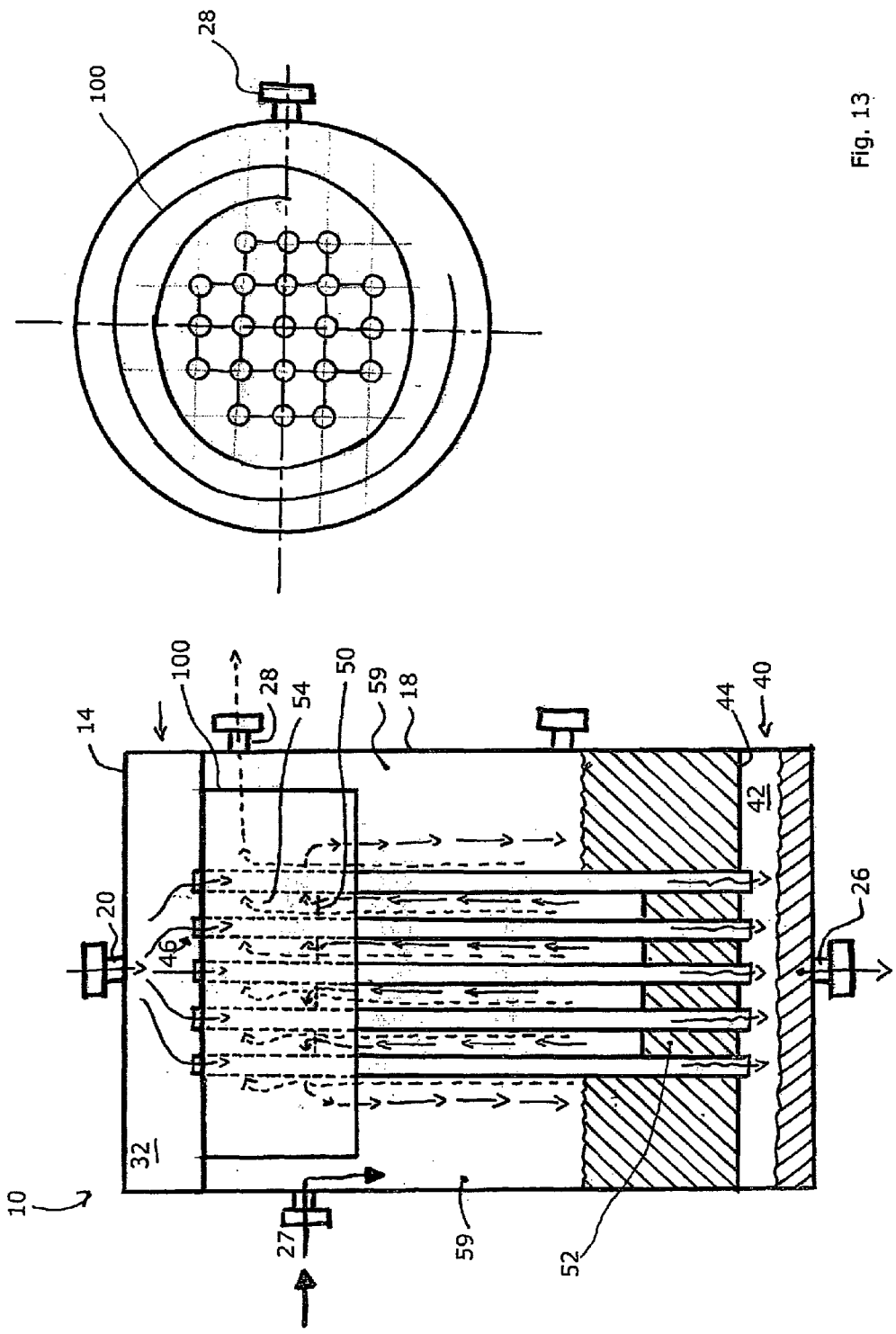
FIG. 13 shows an embodiment of a cyclone shaped vane around the collecting chamber of the second fluid.

FIG. 13 shows a cyclone shaped vane 100 around the collecting chamber 54 of the second fluid which separates the vapour and liquid phase by centrifugal forces generated by the velocity of the second fluid. The 2-phase second fluid exiting the second flow path is forced to circulate by the cyclone shaped vane 100. The separated liquid phase is forced downwards by gravity into the gap 59. The remaining vapour phase is discharged via the outlet 28 for the vapour phase of the second fluid.

Figure 14:
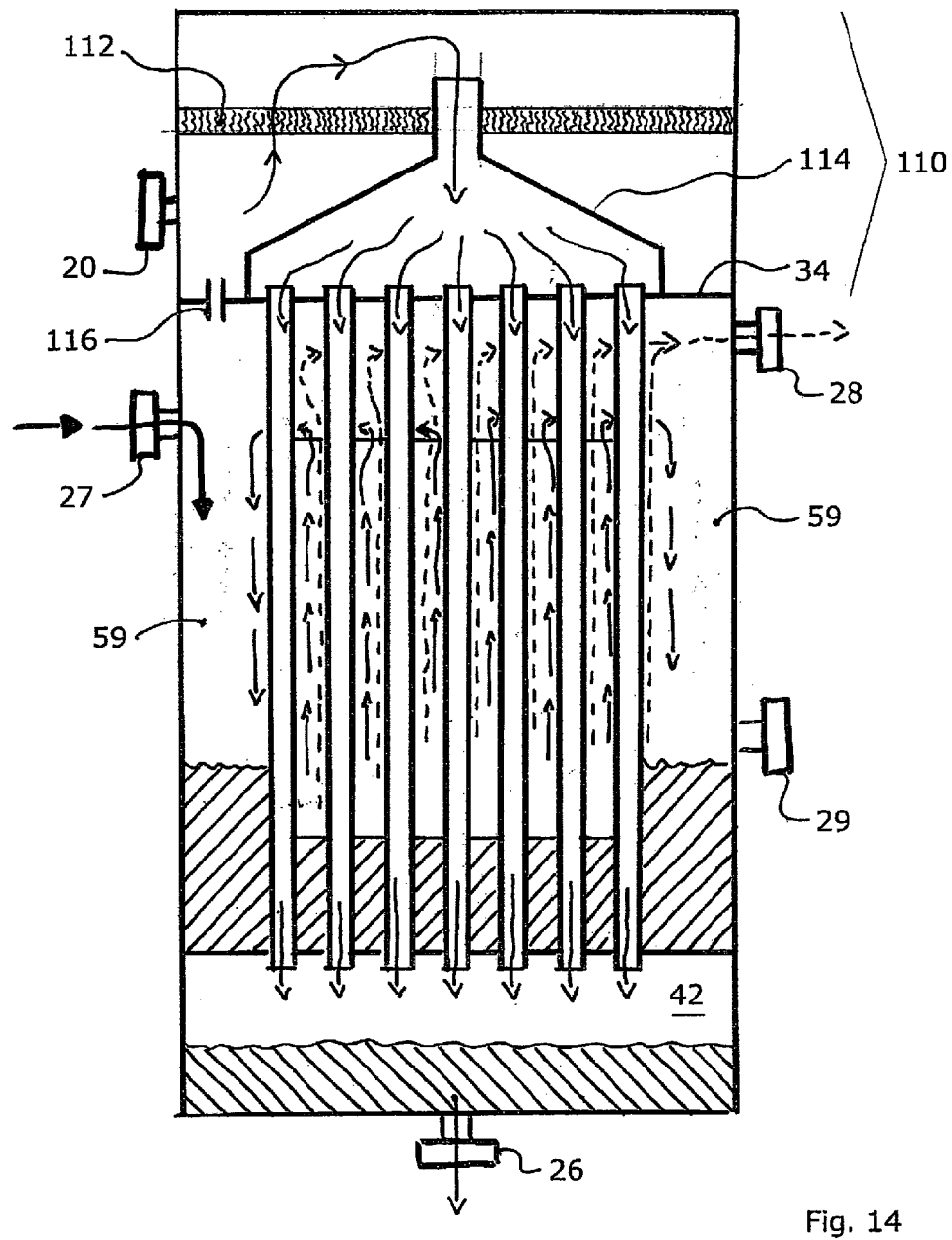
FIG. 14 shows an embodiment of a modified distributing chamber to allow vapour-liquid separation by centrifugal forces and demister mat.

FIG. 14 shows a combined vapour-liquid separating and distributing chamber 110 of an evaporator 10. The inlet 20 of the first fluid, in this case a vapour containing liquid droplets, is tangentially positioned at the side of the combined vapour-liquid separating and distributing chamber 110 of the first fluid. The first fluid is circulating upward while liquid droplets are separated by centrifugal forces until the demister mat 112 is reached. Further vapour-liquid separation occurs inside the demister mat 112 before the remaining vapour passes via a reversed funnel shaped inlet 114 to the distributing panel 34 of the first fluid. The separated liquid droplets of the first fluid are collected at the bottom of the phase separating and distributing chamber 110 and forced by pressure difference into the gap 59 via a weep hole 116 in the distributing panel 34 of the first liquid.

Figure 15:
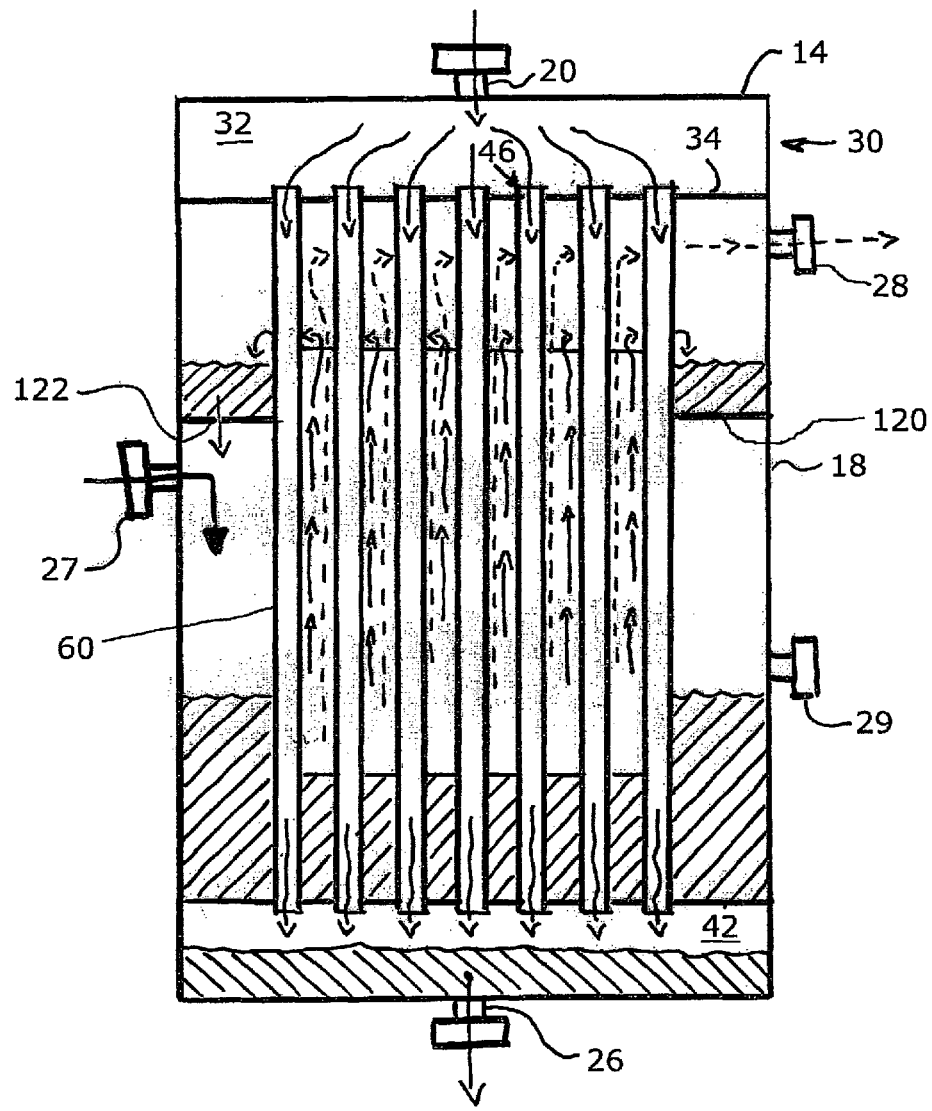
FIG. 15 shows a embodiment of an evaporator according to the invention with an restriction plate in the recycle compartment.

FIG. 15 shows a restriction plate 120 with holes 122 located around the stack of modules 60 between the outlet 28 for the vapour phase of the second fluid and the inlet 27 of the second fluid. The circulating liquid phase of the second fluid is collected at the restriction plate 120 and redirected to the side of the housing 12 where the inlet 27 of the second fluid is located to allow mixing. The flow is orientated downward due to gravity.

Figure 16:
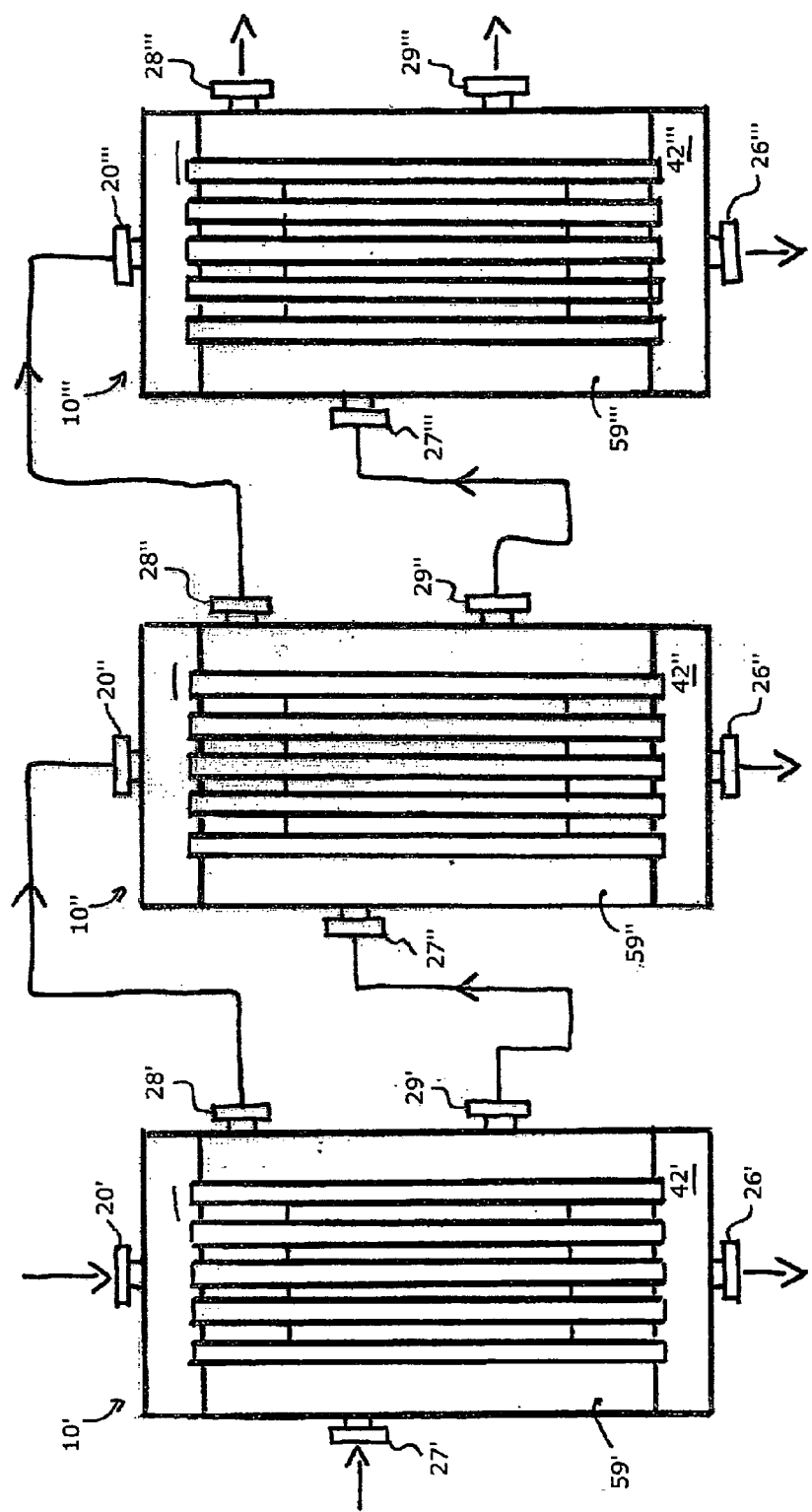
FIG. 16 shows a schematic of multi effect distillation set-up of 3 evaporators in series.

FIG. 16 shows a schematic view of a multi effect distillation process with 3 evaporators according to the invention in series. The first fluid to the first evaporator 10' acts as the main heat source either as from sensible heat of a liquid stream or from latent heat of a condensing vapour. The main feed is introduced to the first evaporator 10' via the inlet nozzle 27 of the second fluid. The vapour exiting the first evaporator 10' is the heat source of the second evaporator 10" and the concentrated liquid phase of the first evaporator 10' is the feed for the second evaporator 10" operating at a lower temperature and pressure. The subsequent vapour phase of the second fluid of the second evaporator 10" exiting the second evaporator is the heat source for the third evaporator 10''' and the concentrated liquid phase of the second evaporator 10" is the feed for the third evaporator 10''' operating at again a lower temperature and pressure. The vapour phase of the third evaporator 10''' is led to a final condenser (not shown) operating at the lowest temperature and pressure. Non-condensables are removed by a vacuum created by standard devices, like vacuum pump, steam or liquid jet. The outflow of the second and third evaporator together with the condensed vapour of a final condensor is collected as purified solvent. The liquid exiting the third evaporator is the concentrated brine. This multi effect distillation process reuses the heat input to the first evaporator 2 times more in order to further purify the solvent and to further concentrate the brine.

Figure 17:
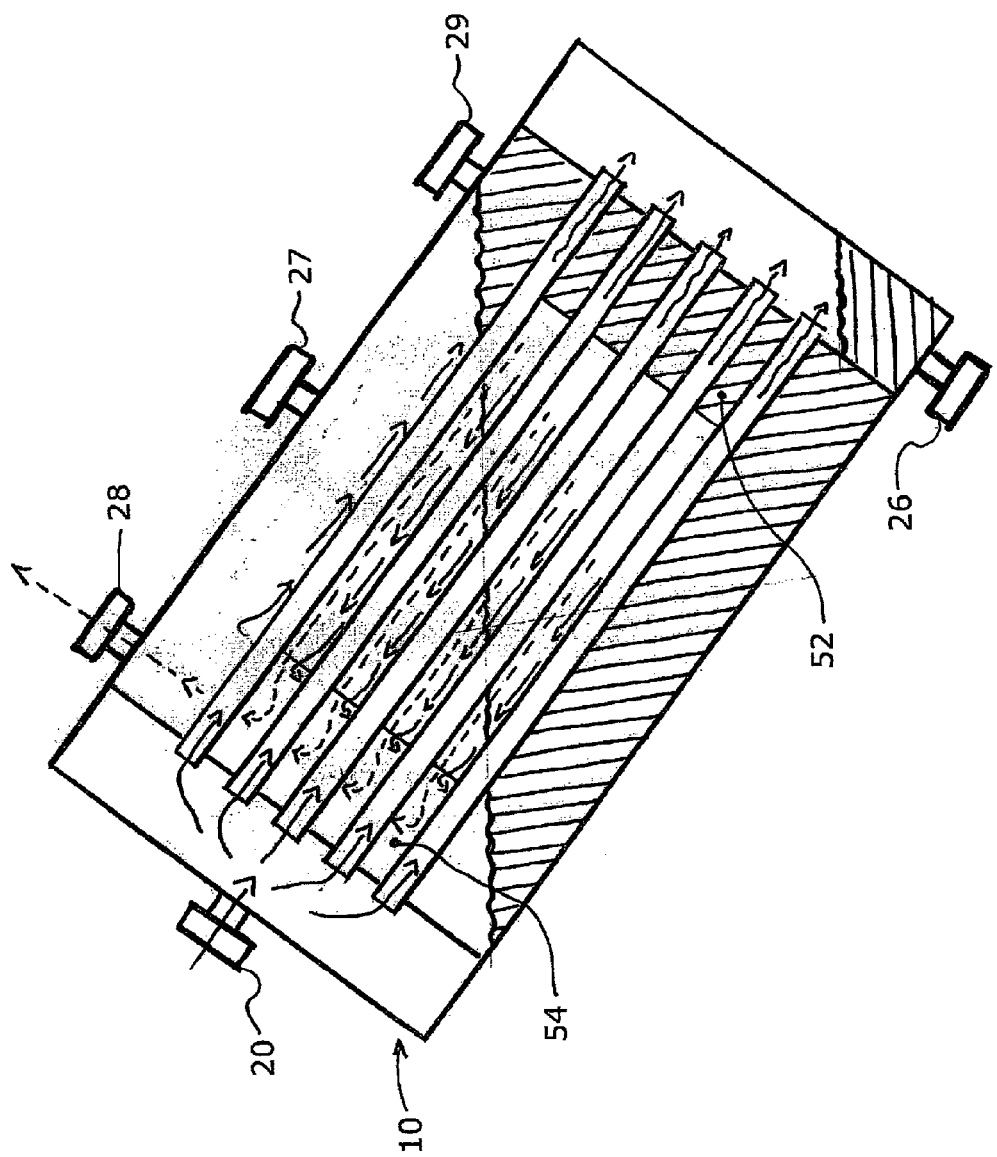
FIG. 17 shows an alternative embodiment of a thermo siphon evaporator according to the invention in a slight angled horizontal position.

FIG. 17 shows an alternative embodiment of a thermo siphon evaporator according to the invention in a slightly angled horizontal position.

Figure 18:
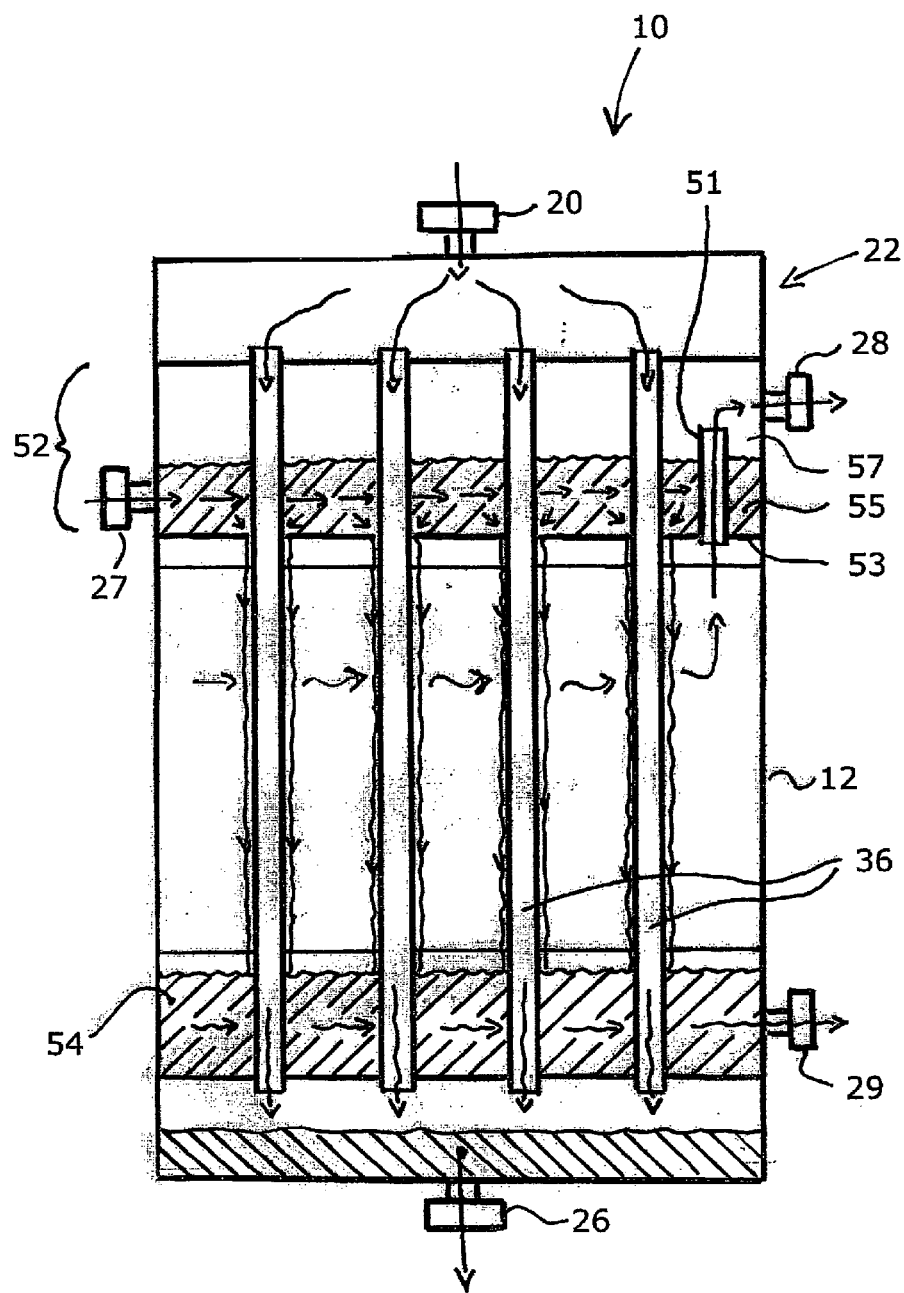
FIG. 18 shows a first embodiment of a falling film evaporator according to the invention.

FIG. 18 shows a schematic view of an embodiment of a falling film evaporator 10 according to the invention, which utilizes the stack of modules in a different configuration. For sake of convenience, components of the evaporator 10 identical to the ones of the previous figures, have been indicated by the same reference numerals. This evaporator 10 is positioned in a vertical position and does not require a gap between the stack of modules and the housing 12 of the evaporator. The fluids fed to this falling film evaporator are orientated according to a co-current configuration of the flow paths. The first fluid acting as a heat source, like sensible heat from a liquid or latent heat from a condensing vapour, is fed to the first flow path of the evaporator via the inlet 20 and distributor 30 of the first fluid. Again this flow path comprises the longitudinal tubes 36 of the stack of modules comprising at least one tube 36 and associated connectors 50. This first fluid is discharged from a collector 40 via the outlet 26 of the first fluid after heat transfer between the first and second fluid. The second fluid is fed via the inlet 27 of the second fluid into the distributor 52 of the second fluid which is separated by a distributing plate 53 into a second fluid distributing zone 55 and collecting zone 57 for the vapour phase of the second fluid. The distributing plate 53 has 'oversized' through bore holes for the longitudinal tubes 36 leaving free slits 37 through which second fluid can pass to create a falling film of the second fluid at the surface of the modules. In other words, the longitudinal tubes 36 are fitted in a non-sealing manner in the through bore holes. The film of the second fluid flows through the collecting zone 57 of the vapour phase of the second fluid into the second flow path of the stack of modules and is collected in the collector 54 of the liquid phase of the second fluid and subsequently discharged via the outlet 29 of the liquid phase of the second fluid. As a result of transferred heat from the first fluid the second fluid falling film is partly evaporated, here called the vapour phase of the second fluid. The vapour phase of the second fluid flows in the opposite direction of the falling film into the collecting zone 57 of the vapour of the second fluid and is discharged via the outlet 28 of the vapour phase of the second fluid. The second fluid distributing zone 55 and collecting zone 57 for the vapour phase of the second fluid are connected via a pressure equalization tube 51.

Figure 19:
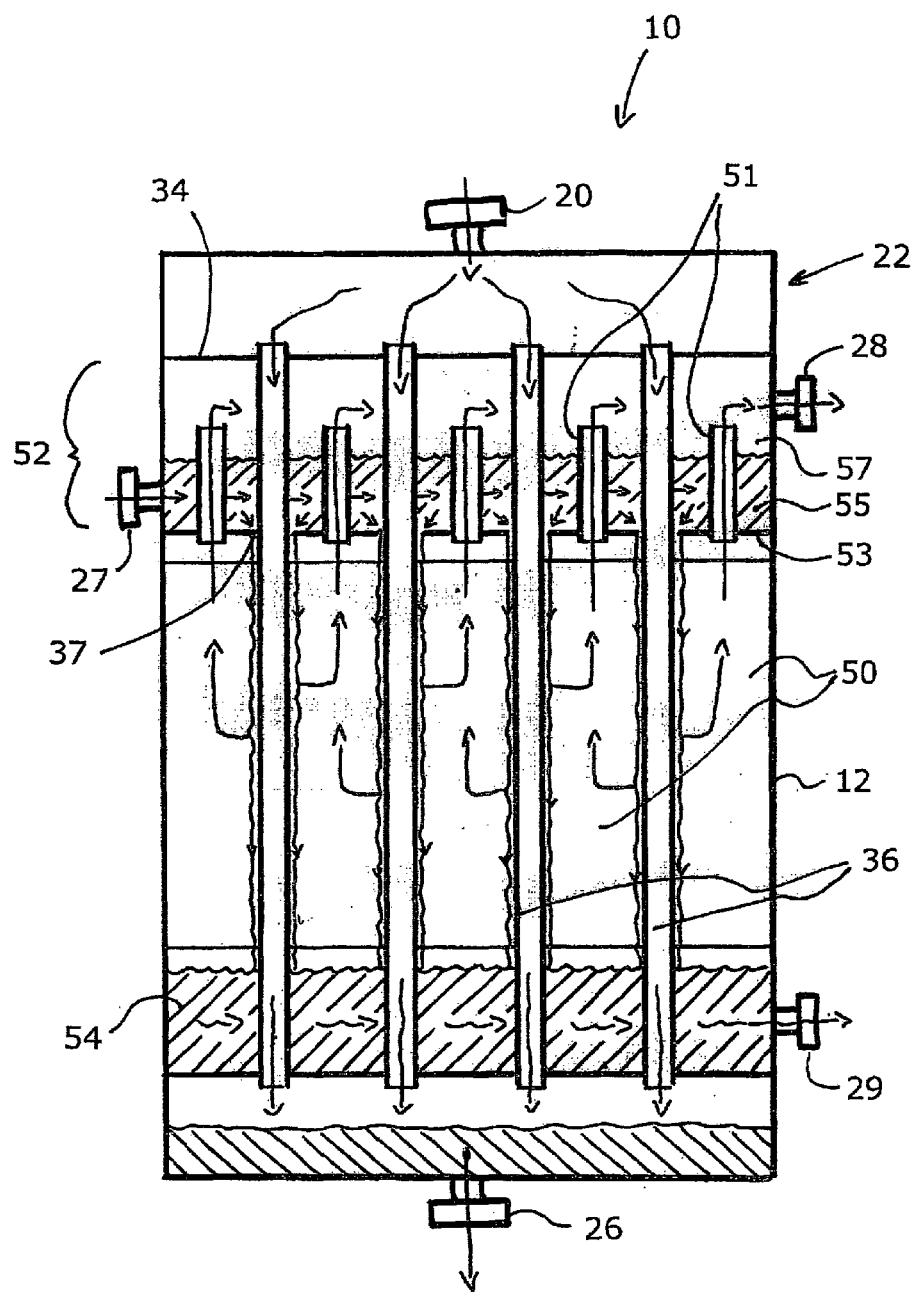
FIG. 19 shows an alternative embodiment of a falling film evaporator.

FIG. 19 shows an alternative arrangement of the second fluid distributor 52. In this configuration the distributing plate has multiple pressure equalization tubes 51 and is located close to the inlet of the stack of modules. The distributing zone 55 of the second fluid is determined by the distributing plate 53 and the top end of the pressure equalization tubes 51. The collecting zone 57 of the vapour phase of the second fluid is determined by the top end of the pressure equalization tubes 51 and the distributing panel 34

It will be obvious to the skilled person that many deviations and modifications from the embodiments shown in the drawings can be easily manufactured. These modifications and deviations are within the scope of the attached claims.

The invention claimed is:

1. An evaporator for heat exchange between fluids, comprising a housing having at least one inlet and at least one outlet for each fluid, the inlet and outlet for each fluid being connected to one another by a flow path, the flow path of a first fluid comprising multiple heat exchange modules comprising at least one longitudinal hollow tube, wherein the modules are arranged in a stack, wherein the space enclosed between adjacent modules in the stack defines a flow path for a second fluid, wherein the evaporator comprises a first distributor for connecting the inlet for the first fluid to the flow path of the first fluid, a first collector for connecting the flow path of the first fluid to the outlet for the first fluid, a second distributor and a second collector for the second fluid, which are in fluid communication via the space enclosed between adjacent modules in the stack defining the flow path for the second fluid, wherein the stack is spaced apart from the housing leaving free a gap, wherein the gap between the housing and the stack defines at least a liquid recycle zone for containing the second fluid, which liquid recycle zone is in fluid communication with the inlet for the second fluid and the second distributor for the second fluid, and a phase separation zone for separating a vapour phase and a liquid phase of the second fluid, which phase separation zone is in fluid communication with the second collector for the second fluid, the outlet for the vapour phase of the second fluid and the liquid recycle zone of the gap, and wherein the housing comprises at least one outlet for a vapour phase of the second fluid and at least one outlet for a liquid phase of the second fluid, which is arranged at a lower height than the at least one outlet for a vapour phase of the second fluid, and wherein each module is provided with at least one connector for connecting to a co-operating connector of each adjacent module, and the co-operating connectors of different modules are partitions separating adjacent spaces forming the flow path for the second fluid, parallel to the flow path for the first fluid.

2. The evaporator according to claim 1, wherein a connector substantially extends over the whole length of a module, parallel to the longitudinal axis of a module.

3. The evaporator according to claim 1, wherein at both ends of the longitudinal tube the ends of the connectors have been removed over a certain length.

4. The evaporator according to claim 3, wherein the length is sufficient to provide fluid communication from the gap to a distributor for the second fluid in the stack of modules.

5. The evaporator according to claim 1, wherein the modules are arranged vertically and the fluid communication between the gap and the space is at the lower liquid recycle zone and at the upper phase separation zone.

6. The evaporator according to claim 1, wherein the phase separation zone comprises a physical means for separating the vapour phase and the liquid phase of the second fluid.

7. The evaporator according to claim 1, wherein a liquid seal means separating the phase separation zone from the liquid recycle zone is arranged around the matrix configuration of modules.

8. The evaporator according to claim 1, wherein the modules are made from plastic.

9. The evaporator according to claim 1, wherein a module comprises at least one female and at least one male connector.

10. An assembly of at least two evaporators according to claim 1, wherein the outlet of the vapour phase of the second fluid of a first evaporator is in fluid communication with the inlet of the first fluid of a subsequent evaporator and the outlet of the liquid phase of the second fluid of the first evaporator is in fluid communication with the inlet of the second fluid in the subsequent evaporator.

11. A method of evaporating a liquid comprising dissolved or dispersed solids using the evaporator according to claim 1, comprising the steps of:

feeding a first fluid having a heat content and a second liquid comprising dissolved or dispersed solids separately at different sides of a heat exchanging surface of the evaporator, such that said second liquid is maintained at a certain level in a liquid recycle zone of said evaporator, thereby exchanging heat from the first fluid to the second liquid and partially evaporating said second liquid generating a vapour-liquid mixture, separating vapour from the vapour-liquid mixture in a phase separation zone of the evaporator and returning the liquid to the liquid recycle zone, wherein the flow of the second fluid is driven by a thermo siphon phenomena.

12. The method according to claim 11, wherein the second fluid is a liquid selected from the group consisting of a salt containing solvent and a solid food particles containing liquid.

13. A falling film evaporator for heat exchange between fluids, comprising a housing having at least one inlet and at least one outlet for each fluid, the inlet and outlet for each fluid being connected to one another by a flow path, the flow path of a first fluid comprising multiple heat exchange modules comprising at least one longitudinal hollow tube, wherein the modules are arranged in a stack, and wherein a module is provided with at least one connector for connecting to a co-operating connector of an adjacent module, such that the space enclosed between adjacent modules in the stack defines a flow path for a second fluid, parallel to the flow path for the first fluid, a distributor for the second fluid comprising a distributing plate having through bores of larger dimensions than the cross-section of the tubes extending through the through bores such that second fluid is able to flow from the inlet via the through bores into the second flow path.

14. The evaporator according claim 6, wherein the physical means is a cyclone shared vane, a vapour-liquid separation chamber or both.

15. The evaporator according to claim 7, wherein the liquid seal means is a perforated restriction plate.

16. The evaporator according to claim 9, wherein the module comprises four alternating male and female connectors at an angle of 90°.

17. The method according to claim 11, wherein the first fluid is fed to the inlet for the first fluid to the first distributor, and flows from the first distributor through the longitudinal tubes of the modules to the first collector, and from the first collector to the outlet for the first fluid, and wherein the second liquid is fed to the inlet for the second fluid, and flows from said inlet to the liquid recycle zone of the gap, wherein part of the second liquid is discharged through the outlet for the liquid phase of the second fluid by overflow, and wherein the other part of the second liquid flows from the liquid recycle zone of the gap to the second distributor, and then from the second distributor via the space enclosed between adjacent modules to the second collector, during which the second liquid is partially evaporated by exchanging heat from the first fluid to the second fluid so as to generate the vapour-liquid mixture rising in the space enclosed between adjacent modules to the second collector, and wherein the vapour-liquid mixture flows from the second collector to the phase separation zone of the gap, in which the vapour which is separated from the vapour-liquid mixture in the phase separation zone of the gap is discharged through the outlet for the vapour phase of the second fluid, and wherein the liquid of the second fluid is returned from the phase separation zone of the gap via the gap to the liquid recycle zone of the gap by gravity.

18. The method according to claim 17, wherein the evaporator is an assembly of at least two evaporators, wherein the outlet of the vapour phase of the second fluid of a first evaporator is in fluid communication with the inlet of the first fluid of a subsequent evaporator and the outlet of the liquid phase of the second fluid of the first evaporator is in fluid communication with the inlet of the second fluid in the subsequent evaporator.

19. The method according to claim 12, wherein the salt containing solvent is sea water or brackish water, and the solid food particles containing liquid is a fruit juice or milk.

20. The method according to claim 11, wherein the evaporator is an assembly of at least two of the evaporators, wherein the outlet of the vapour phase of the second fluid of a first evaporator is in fluid communication with the inlet of the first fluid of a subsequent evaporator and the outlet of the liquid phase of the second fluid of the first evaporator is in fluid communication with the inlet of the second fluid in the subsequent evaporator.

* * * * *